United States Patent
Washima et al.

(10) Patent No.: US 7,871,737 B2
(45) Date of Patent: Jan. 18, 2011

(54) METAL COMPOSITE FOR FUEL CELL AND FUEL CELL BIPOLAR PLATE USING SAME, AND FABRICATION METHOD FOR SAME

(75) Inventors: Mineo Washima, Tsuchiura (JP); Takaaki Sasaoka, Tsuchiura (JP); Masahiro Seido, Tsuchiura (JP); Kazuhiko Nakagawa, Tsuchiura (JP)

(73) Assignee: Hitachi Cable, Ltd., Tokyo (JP)

( * ) Notice: Subject to any disclaimer, the term of this patent is extended or adjusted under 35 U.S.C. 154(b) by 180 days.

(21) Appl. No.: 12/232,485

(22) Filed: Sep. 18, 2008

(65) Prior Publication Data

US 2009/0081522 A1 Mar. 26, 2009

(30) Foreign Application Priority Data

Sep. 20, 2007 (JP) .............................. 2007-243963

(51) Int. Cl.
*H01M 8/04* (2006.01)
*H01M 2/18* (2006.01)
*B21C 1/00* (2006.01)
*C23F 1/00* (2006.01)
*B44C 1/00* (2006.01)
*C25D 5/02* (2006.01)

(52) U.S. Cl. .................. 429/514; 429/518; 428/577; 216/39; 216/52; 205/122

(58) Field of Classification Search ............... 429/34, 429/514, 518; 428/577, 675, 680; 216/39, 216/122, 52; 96/4
See application file for complete search history.

(56) References Cited

U.S. PATENT DOCUMENTS

| 4,942,099 A | * | 7/1990 | Isobe et al. | .................. 429/35 |
| 4,950,563 A | * | 8/1990 | Stewart et al. | ............. 429/498 |
| 2003/0178707 A1 | * | 9/2003 | Abbott | ...................... 257/666 |
| 2007/0044661 A1 | * | 3/2007 | Sasaoka | ........................ 96/4 |

FOREIGN PATENT DOCUMENTS

| JP | 2005-158441 | 6/2005 |
| JP | 2006-210320 | 8/2006 |

OTHER PUBLICATIONS

Turner et al., "Anodized Architectural Aluminum Combined with an Organic Seal", YKK AP America Inc., 2003.*
Onischak et al., "Development of a $10/kW Bipolar Plate Separator Plate", Paper for 1999 Joint DOE/EPRIGRI Fuel Cell Technology Review Conference, Morning Session, Aug. 4, 1999.*
ACME Companies, "Metal Forming, 5-800 Ton Punch Presses Information", ACME Companies, Wheaton, IL.*

* cited by examiner

*Primary Examiner*—Jonathan Crepeau
*Assistant Examiner*—Kenneth Douyette
(74) *Attorney, Agent, or Firm*—Antonelli, Terry, Stout & Kraus, LLP

(57) ABSTRACT

A metal composite for fuel cells according to the present invention, which includes: a core of a metal; cladded layers of a corrosion resistant metal covering both surfaces of the core; and a through-hole formed through the core and cladded layers. The through-hole has, on a hole wall of the core region of the through-hole, a concave portion which is recessed relative to hole walls of the cladded layer regions of the through-hole.

20 Claims, 6 Drawing Sheets

METAL COMPOSITE FOR FUEL CELL AND FUEL CELL BIPOLAR PLATE USING SAME, AND FABRICATION METHOD FOR SAME

CLAIM OF PRIORITY

The present application claims priority from Japanese patent application serial no. 2007-243963 filed on Sep. 20, 2007, the content of which is hereby incorporated by reference into this application.

BACKGROUND OF THE INVENTION

1. Field of the Invention

The present invention relates to metal composites for fuel cells, which have a core cladded with a corrosion resistant metal and have through-holes formed therethrough, and fuel cell bipolar plates fabricated from such a metal composite. The present invention also relates to fabrication methods for the metal composites.

2. Description of Related Art

Conventionally, metal composites formed by laminating and bonding a plurality of metals are used in various fields. In particular, materials having a Ti (titanium) surface layer are being developed for use in fuel cell bipolar plates exposed to harsh corrosive environments. Examples of prior patent documents which disclose a fuel cell bipolar plate fabricated from a material having a Ti surface layer includes, e.g., JP-A-2006-210320 and JP-A-2005-158441.

The Ti is a typical corrosion resistant metal. However, corrosion resistant metals are very expensive and therefore cannot be used freely for bipolar plates of consumer fuel cells. To address this problem, the present inventors are developing bipolar plates fabricated from a metal composite made of an inexpensive core material cladded with a corrosion resistant metal on both surfaces (e.g., JP-A-2006-210320).

Generally, in fuel cells, the fuel gas and oxidant gas (e.g., air) used for generating electricity are humidified (e.g., concentrated methanol is humidified (diluted) with water generated at the air electrode) in order to improve the power generation characteristics. These gases are supplied to each MEA (Membrane Electrode Assembly) via through-holes formed in the bipolar plates. In other words, each bipolar plate is required to be provided with through-holes, which are part of the fuel and oxidant gas conduits.

A problem with conventional metal composites for fuel cells is that the hole wall of the core layer region of the through-hole is exposed to the ambient environment, and therefore dissolution (corrosion) of the core material can occur due to dew condensation or a pH change caused by impurity ions contained in the oxidant gas. Furthermore, when an Al (aluminum) is employed as the core metal in order to reduce the weight of a bipolar plate, more reliable anti-corrosion protection is needed because the Al is far less resistant to such core dissolution than a stainless steel.

A method for covering exposed core surfaces is disclosed, for example, in the above-mentioned JP-A-2005-158441 in which, in order to suppress corrosion of the core metal of the bipolar plate, the through-hole wall and plate surfaces surrounding the hole are adhesively covered by a film coating. However, the method according to the above JP-A-2005-158441 covers each through-hole individually, and therefore can cause an increase in the number of components and the manufacturing cost. Further, in this method, the resin film can block the through-hole, or can thicken the portion of the bipolar plate surrounding each through-hole, thus possibly incurring assembly difficulty.

SUMMARY OF THE INVENTION

Under these circumstances, it is an objective of the present invention is to provide a metal composite for fuel cells and a fuel cell bipolar plate fabricated from the metal composite, which can prevent the core material from being directly exposed to the corrosive environment while suppressing an increase in the number of components. Furthermore, it is another objective of the present invention to provide a fabrication method for the metal composite providing fabrication simplicity and a low cost.

(1) According to one aspect of the present invention, there is provided a metal composite for fuel cells, which includes: a core of a metal; cladded layers of a corrosion resistant metal covering both surfaces of the core; and a through-hole formed through the core and cladded layers, which has, on a hole wall of the core region of the through-hole, a concave portion which is recessed relative to hole walls of the cladded layer regions of the through-hole.

In the above aspect (1) of the present invention, the following modifications and changes can be made.

(i) Projected hole wall portion of each cladded layer region of the through-hole is bent inwardly.

(ii) The concave portion is filled with a dissolution-inhibiting material, such as a resin, for preventing dissolution of the core.

(2) According to another aspect of the present invention, there is provided a fuel cell bipolar plate fabricated from the metal composite of the above aspect (1) of the present invention.

(3) According to still another aspect of the present invention, there is provided a fabrication method for a metal composite for fuel cells, which includes the steps of: covering both surfaces of a core of a metal with a cladded layer of a corrosion resistant metal; forming a through-hole through the core and cladded layers; and etching a hole wall of the core region of the through-hole to form a concave portion which is recessed relative to hole walls of the cladded layer regions of the through-hole.

In the above aspect (3) of the present invention, the following modifications and changes can be made.

(iii) After the step of formation of the concave portion, there is an added step of forcing a punch against and inwardly bending projected hole wall portion of each cladded layer region of the through-hole which is projected relative to the hole wall of the core region of the through-hole.

(iv) There are added steps of: anodizing a surface of the concave portion; and applying a boehmite treatment to the anodized surface.

(v) There is an added step of filling a dissolution-inhibiting material to the concave portion for preventing dissolution of the core.

ADVANTAGES OF THE INVENTION

The metal composite according to the invention provides extended service lives of fuel cell components such as bipolar plates and greater flexibility of choice of the core material.

DETAILED DESCRIPTION OF THE PREFERRED EMBODIMENTS

Preferred embodiments of the present invention will be described below with reference to the accompanying drawings. However, the present invention is not limited to the embodiments described herein.

First Embodiment of the Invention (Structure of Metal Composite)

Figure 1A:
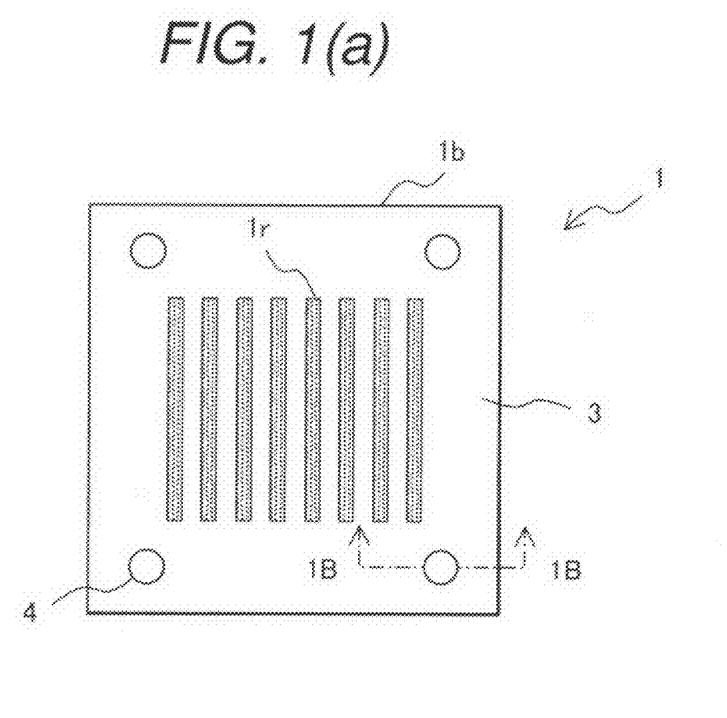
FIG. 1(a) is a schematic illustration showing a plan view of a metal composite for fuel cells according to a first preferred embodiment of the present invention.
Figure 1B:
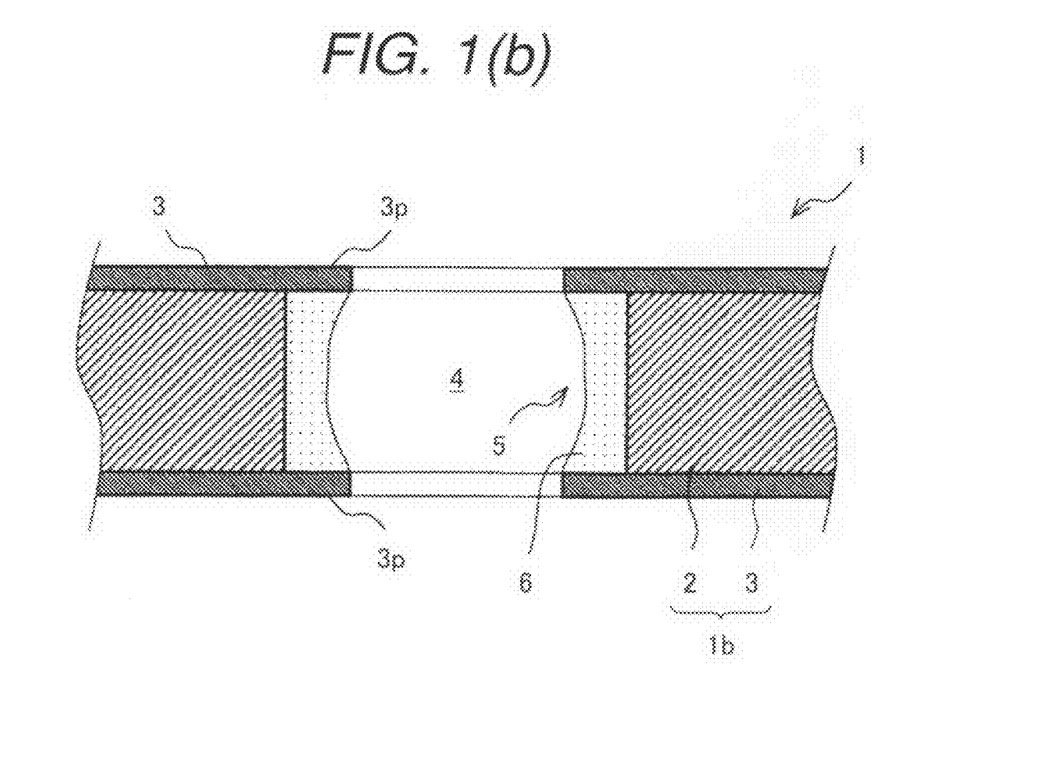
FIG. 1(b) is a schematic illustration showing a cross-sectional view along 1B-1B line in FIG. 1(a).

FIG. 1(a) is a schematic illustration showing a plan view of a metal composite for fuel cells according to a first preferred embodiment of the present invention; and FIG. 1(b) is a schematic illustration showing a cross-sectional view along 1B-1B line in FIG. 1(a).

As shown in FIGS. 1(a) and 1(b), a metal composite 1 for fuel cells according to the first embodiment includes: a core 2 of a metal plate; cladded layers (corrosion resistant cladded layers) 3 covering both surfaces of the core 2; and through-holes 4 penetrating both the core 2 and cladded layers 3 in the thickness direction (perpendicular to the drawing plane of FIG. 1(a) and vertical direction as viewed in FIG. 1(b)). In addition, on a hole wall of the core 2 region of each through-hole 4 of the metal composite 1, there is formed a circumferentially-extending concave portion 5 that is recessed relative to a hole wall of the cladded layer 3 regions on both sides of the core 2. In other words, in the cladded layer 3 regions of each through-hole 4 on both sides of the core 2 region, there is formed a circumferentially-extending and centrally-projecting projection portion 3p.

Further, each concave portion 5 is filled with a dissolution-inhibiting material 6 such as a resin in order to prevent dissolution of the core 2 into the ambient environment in use, operation and storage of the metal composite 1. The dissolution-inhibiting material 6 is preferably filled into each concave portion 5 in such a manner as to prevent the hole wall of the core 2 region from being exposed to the interior of the through-hole 4. FIG. 1(b) illustrates an example in which the dissolution-inhibiting material 6 is filled into the concave portion 5 in such a manner as to have a slightly concaved surface extending from both projection portions 3p.

Besides, FIG. 1 illustrates an example in which four through-holes 4 with a circular cross section are formed near the four corners of the metal composite body 1b. In addition, on a central portion of both faces of the metal composite body 1b, a ridge-and-groove structure 1r serving as a gas conduit is formed by, for example, folding or pressing.

The core 2 is made of a metal such as Al, Cu (copper), Fe (iron), Ni (nickel), and Pb (lead) or an alloy thereof, or stainless steel, or a stainless-steel/metal-composite. The cladded layers 3 are made of a corrosion resistant metal such as Au (gold), Pd (palladium), Pt (platinum), Ni, Ta (tantalum), Nb (niobium), W (tungsten), Ti, or an alloy thereof, or stainless steel.

Although an Al or an Al alloy is preferable for the core 2 from the weight and price points of view, other common metals such as stainless steel, Ni, and Cu may also be used. On the other hand, the metal used for the core 2 is preferably dissolvable relatively than the cladded layers 3 in an etchant such as an acid solution and an alkaline solution (both of which will be described later). In other words, any metal may be used as long as the etch rate of the core 2 is faster than that of the cladded layer 3. This causes the hole walls of the cladded layers 3 to project relative to the hole wall of the core 2, thus preventing or suppressing exposure of the core 2 to the ambient environment.

For the cladded layers 3, besides Ti and Ti alloys, any metal can be used such as stainless steel alloys, and Ta, Nb, W, Ni, alloys thereof, and compounds thereof as long as the corrosion resistance is excellent and the adverse effects on the fuel cell characteristics are tolerable.

(Fabrication Method for Metal Composite)

Next, an exemplary method of fabricating the metal composite 1 will be described. This embodiment will be described by way of an example in which Al or an Al alloy is employed for the core 2 in order to reduce the weight, and Ti or a Ti alloy is employed for the cladded layers 3 in order to improve the corrosion and heat resistance.

Specifically, a 0.2-mm-thick Al alloy (5000 series in Al—Mg system) is used as the core 2 and a 0.03-mm-thick Ti is used as the cladded layers 3. Firstly, these are laminated together to prepare a thin clad material, which is then press molded to form the metal composite body 1b (prior to formation of the later-described concave portion 5). Here, the through-holes 4 may be formed simultaneously with or after the press molding.

Figure 2A:
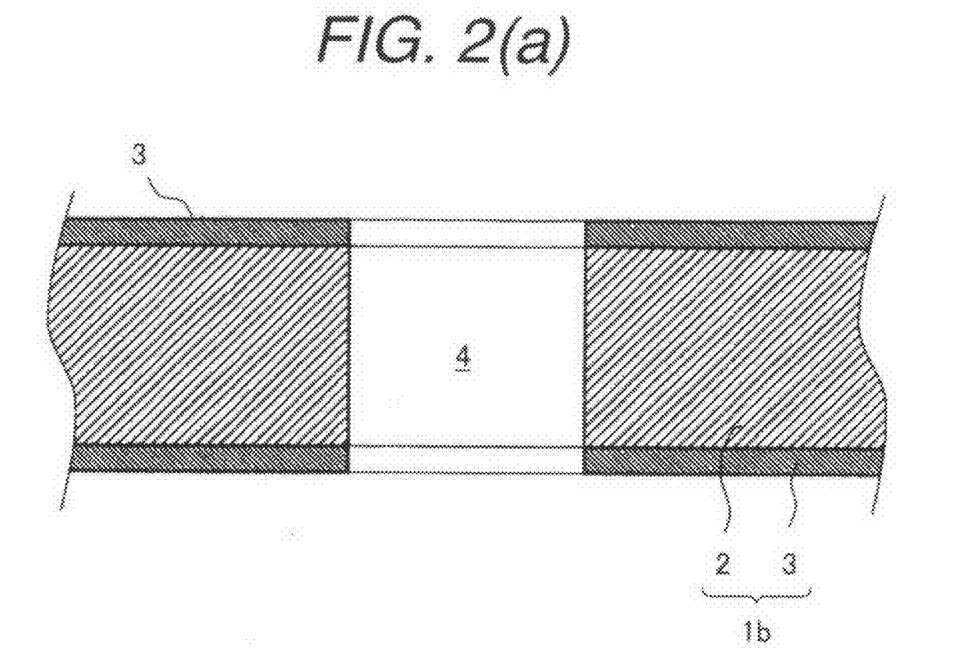
FIGS. 2(a) and 2(b) are schematic illustrations showing a cross-sectional view of an exemplary fabricating method for the metal composite shown in FIG. 1.
Figure 2B:
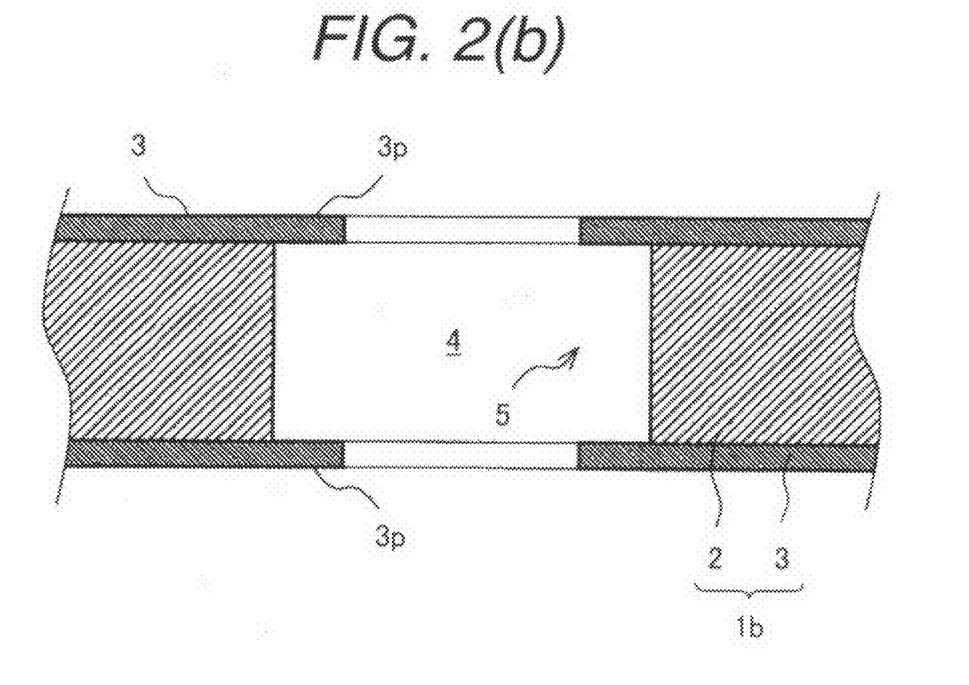

FIGS. 2(a) and 2(b) are schematic illustrations showing a cross-sectional view of an exemplary fabricating method for the metal composite shown in FIG. 1. As shown in FIG. 2(a), the through-holes 4 are formed through the metal composite body 1b composed of the core 2 and cladded layers 3. Then, the hole wall of the core 2 region exposed to the interior of each through-hole 4 is chemically etched to form the concave portion 5 that is recessed relative to the hole walls of the cladded layer 3 regions of the through-hole 4. As described above, when an Al alloy is used for the core 2, it can be chemically etched using an etchant such as an acid solution and an alkaline solution.

Specifically, the metal composite body 1b as shown in FIG. 2(a) is immersed, e.g., in a 1N aqueous sodium hydroxide solution for 5 minutes. This causes only the core material to dissolve in the aqueous sodium hydroxide solution and causes the hole wall of the core 2 region to be recessed relative to the hole walls of the cladded layer 3 regions on both sides. In this manner, the concave portion 5 such as shown in FIG. 2(b) can be formed.

Figure 3:
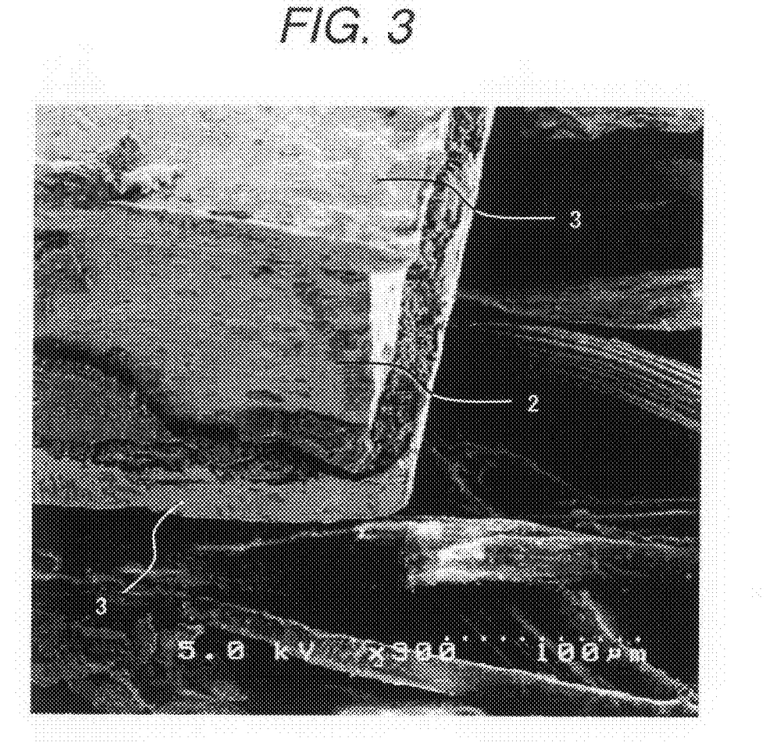
FIG. 3 is a photograph showing a core and cladded layers after the core has been etched to form a concave portion.

FIG. 3 is a photograph showing the core 2 and clad-layers 3 after the core 2 has been etched to form the concave portion 5. However, for clarity's sake, FIG. 3 shows, instead of the interior of the through-hole 4, an outer corner of the metal composite body 1b. Then, the dissolution-inhibiting material 6 is filled in each concave portion 5, thereby obtaining the metal composite 1 such as shown in FIGS. 1(a) and 1(b). As the dissolution-inhibiting material 6, there can be used, e.g., a viscosity-modified ARALDITE (Registered Trade Mark, a two-component adhesive containing an epoxy resin as the main component and a polyamidoamine as a hardener). Furthermore, after the formation of the concave portion 5 and prior to the filling of the dissolution-inhibiting material 6, the concave portion 5 may be subjected to an anodization followed by a boehmite treatment (i.e., filling of a boehmite [alumina monohydrate or aluminum oxide hydroxide] as a resin filler [inorganic filler]).

Effects and Advantages of Preferred Embodiments

Effects and advantages of the first embodiment will be described.

In the metal composite 1 according to the first embodiment, each through-hole 4 has, on the hole wall of the core 2 region, the concave portion 5 that is recessed relative to the hole walls of both cladded layer 3 regions. When the core metal is dissolved as an ion (e.g., $Al^{3+}$) from the hole wall of the core 2 region in the concave portion 5, the ion is difficult to diffuse out of (outflow from) the concave portion 5. Then, the ion is easy to be oxidized and precipitated so that an oxide layer covers the hole wall of the core 2 region. Therefore, dissolution of the core 2 into the ambient environment is suppressed compared to conventional arts in which the hole walls of the core region and cladded layer regions are coplanar. In addition, the concave portion 5 of each through-hole 4, which is formed, for example, by slightly chemically etching the hole wall of the core region, is filled with the dissolution-inhibiting material 6, thus preventing the hole wall of the core 2 region from being exposed to the interior of the through-hole 4.

That is, the hole wall of the core 2 region of each through-hole 4 is not directly exposed to the corrosive environment. So, a low corrosive resistant metal such as an Al and Al alloy can be used for the core 2, because dissolution of such metal is prevented even when there occurs dew condensation or a pH change due to impurity ions contained in the oxidant gas. Thus, the service lives of various fuel cell components (such as bipolar plates) fabricated of the metal composite 1 can be extended.

Since dissolution of the core 2 is suppressed, as the core 2 material there can be used such metals that can cause, if dissolved from the core 2, damaging effects on the operation of the fuel cell. This provides greater flexibility in the choice of the core material.

And, the cladded layers 3 are of a corrosion resistant metal and therefore are less readily etched than the core 2. Thus, the core 2 can be selectively etched. Furthermore, the concave portion 5 of the core metal region is formed so as to have a recessed surface, thereby allowing efficient filling of the dissolution-inhibiting material 6 into the concave portion 5.

In this embodiment metal composite 1, the dissolution-inhibiting material 6 is filled into the concave portion 5 and is spread over the entire surface thereof due to surface tension of a resin; therefore, uncovered (exposed) hole wall areas of the core 2 region can be significantly reduced compared to conventional arts in which a resin is applied on the inner wall of such a through-hole without such concave portion. Thus, the hole wall of the core 2 region of each through-hole 4 can be protected more stably and reproduced.

With the fabrication method according to the present invention, the concave portion 5 can be readily formed just by chemically etching the hole wall of each through-hole of the metal composite body 1b. Therefore, the metal composite 1 capable of preventing dissolution of the core 2 can be readily fabricated from a relatively small number of parts, thus leading to low fabrication cost.

In addition, the surface of the concave portion 5 formed on the core 2 region is anodized to form an oxide film, which is then subjected to a boehmite treatment. This enhances the adhesiveness of the dissolution-inhibiting material 6 to the oxide film, thereby more assuredly preventing dissolution of the core 2.

Figure 4:
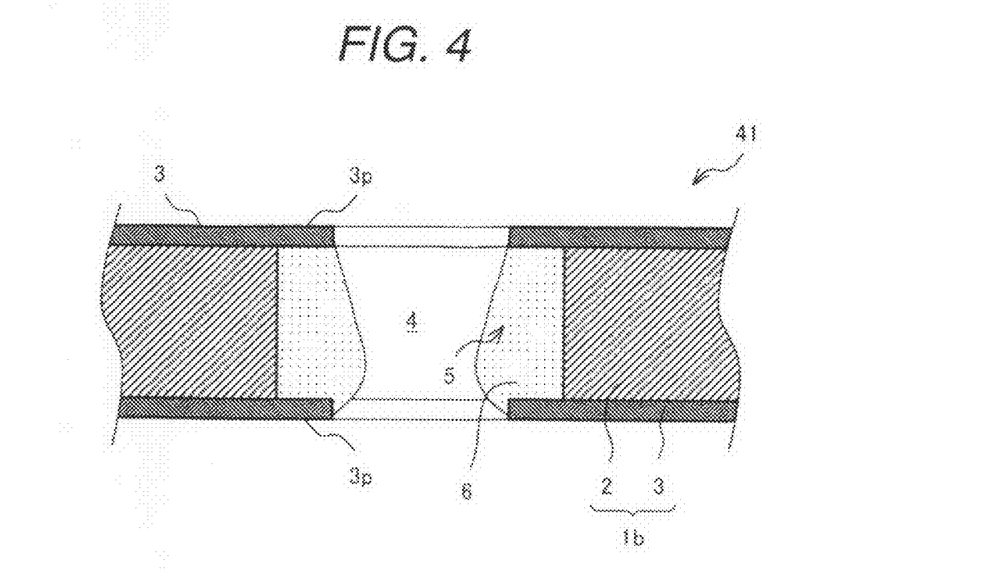
FIG. 4 is a schematic illustration showing a cross-sectional view of a principal portion of a modification of the FIG. 1 metal composite.
Figure 5:
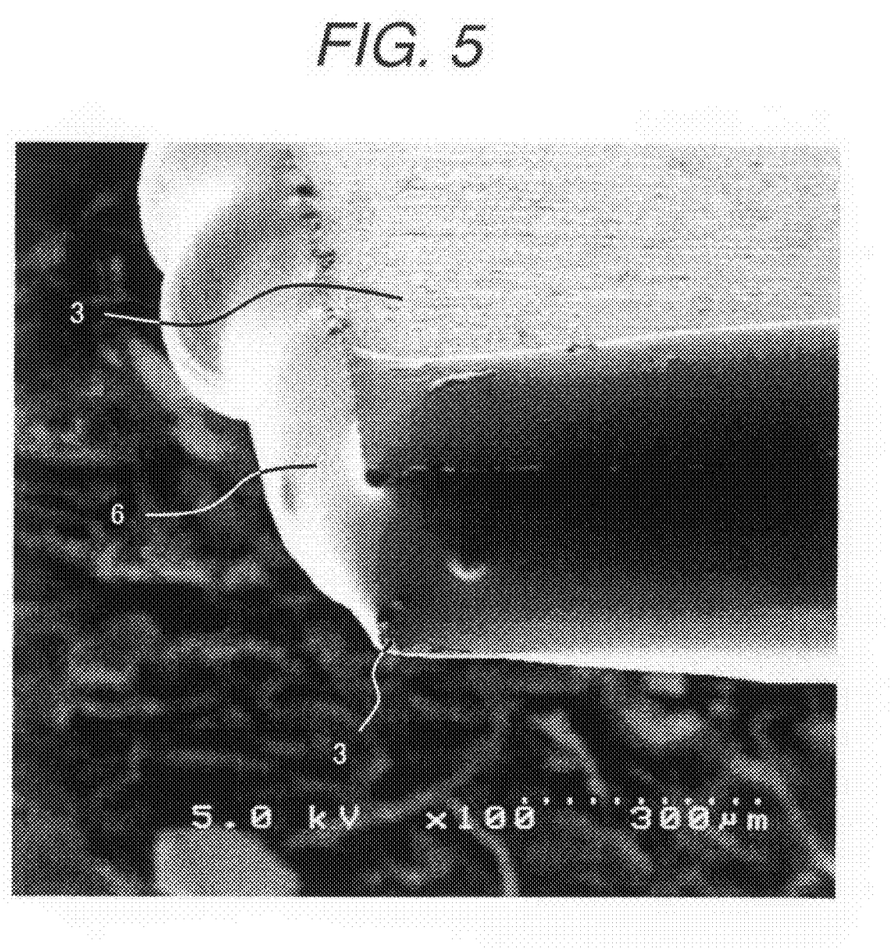
FIG. 5 is a photograph showing a cladded layers and dissolution-inhibiting material after a resin has been filled into the concave portion at the core in FIG. 3.

FIG. 4 is a schematic illustration showing a cross-sectional view of a principal portion of a modification of the FIG. 1 metal composite. As a modification of the FIG. 1 metal composite 1, the dissolution-inhibiting material 6 may be filled in the concave portion 5 in such a manner as to have a slightly convex surface extending from both projection portions 3p as shown in the metal composite 41 of FIG. 4. FIG. 5 is a photograph showing the cladded layers 3 and dissolution-inhibiting material 6 after a resin has been filled into the concave portion 5 at the core 2 in FIG. 3. Similarly to FIG. 3, FIG. 5 shows, instead of the interior of the through-hole, an outer corner of the metal composite body 1b.

(Bipolar Plate for Fuel Cell)

Next, an exemplary application of the metal composite 1 will be described with reference to FIG. 6.

Figure 6:
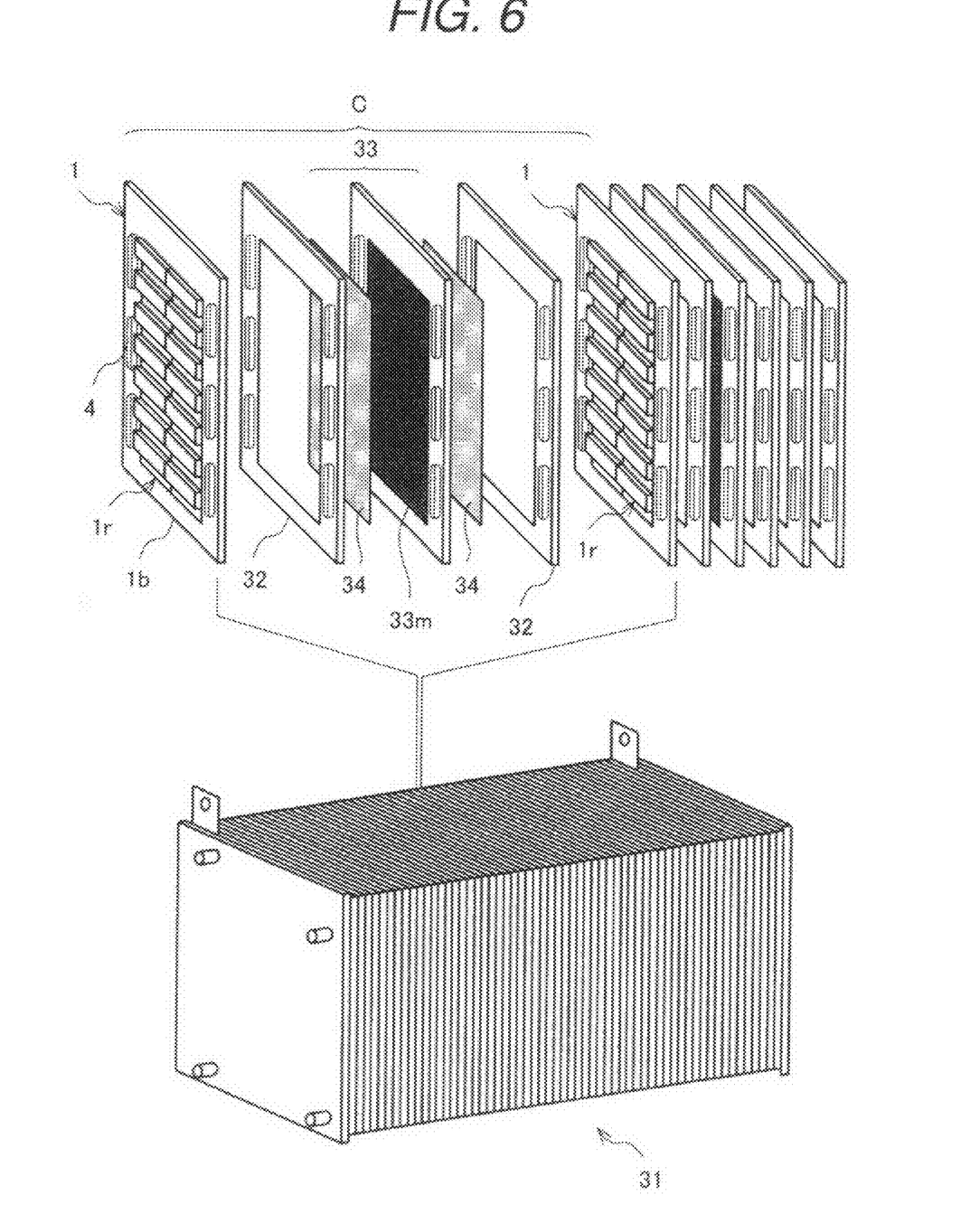
FIG. 6 is a schematic illustration showing a perspective view of a bipolar plate for a polymer electrolyte fuel cell fabricated from the metal composite in FIG. 1 and a stack structure of the polymer electrolyte fuel cell.

FIG. 6 is a schematic illustration showing a perspective view of a bipolar plate for a polymer electrolyte fuel cell fabricated from the metal composite in FIG. 1 and a stack structure of the polymer electrolyte fuel cell. As shown in FIG. 6, the metal composite 1 can be used for the bipolar plate of a fuel cell stack 31. Unlike the square-shaped metal composite 1 in FIG. 1(a), in the FIG. 6 example, the metal composite 1 is rectangular in shape and the through-hole is substantially oval in cross section.

The fuel cell stack 31 is a polymer electrolyte fuel cell (PEFC) and is configured by stacking multiple-unit cells C. This fuel cell stack 31 can be also used for direct methanol fuel cells (DMFCs), which are mounted as a portable power source in portable equipment such as cellular phones and notebook PCs.

The unit cell C includes: a first metal composite 1 serving as a bipolar plate (also called "separator") for separating the fuel and oxidant gas conduits; a first sealing gasket 32 having a central opening; an electricity generating assembly 33; a second sealing gasket 32; and a second metal composite 1. The ridge-and-groove structure 1r on one side of the metal composite 1 serves as a conduit for carrying a fuel gas (e.g., hydrogen obtained from methanol), and that on the other side serves as a conduit for carrying an oxidant gas (e.g., air).

The electricity generating assembly 33 includes: an MEA (a polymer electrolyte membrane supporting catalyst layers) 33m; and gas diffusion layers 34 provided on both surfaces of the MEA 33m and serving as electrodes. One of the gas diffusion layers 34 serves as the fuel electrode, and the other the air electrode.

The bipolar plates account for major part of the cost of such a fuel cell stack 31. So, it is very effective in reducing the cost of a fuel cell that the low-cost and readily-manufacturable metal composite 1 according to the present invention can be provided for such a fuel cell bipolar plate. In addition, the metal composite 1 can also be utilized for the gasket 32 and the frame of the electricity generating assembly 33.

Second Embodiment of the Invention

Figure 7A:
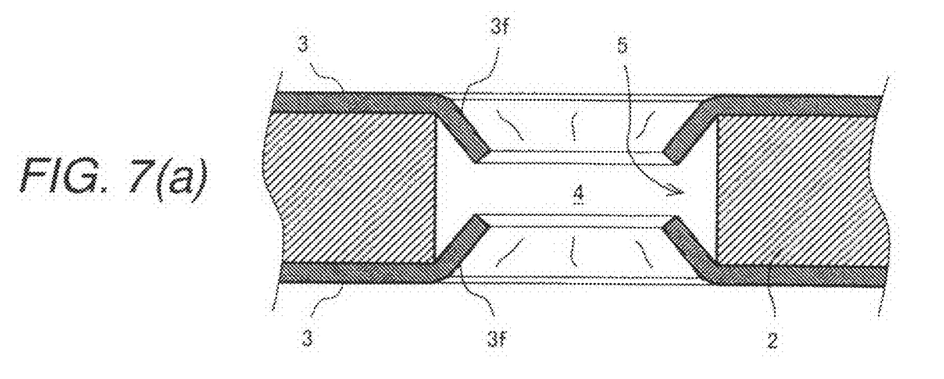
FIG. 7(a) is a schematic illustration showing a cross-sectional view of an exemplary fabricating method of a metal composite for fuel cells according to a second embodiment of the present invention.

A second embodiment of the present invention will be described. FIG. 7(a) is a schematic illustration showing a cross-sectional view of an exemplary fabricating method of a metal composite for fuel cells according to a second embodiment of the present invention; and FIG. 7(b) is a schematic illustration showing a cross-sectional view of a principal portion of the metal composite according to the second embodiment.

Figure 7B:
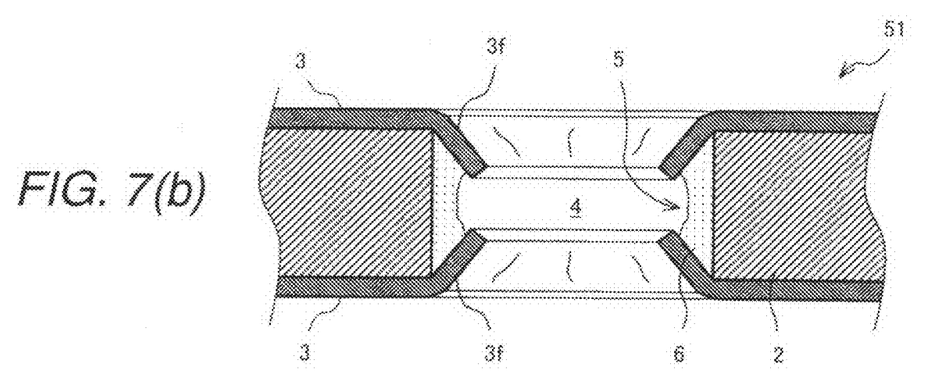
FIG. 7(b) is a schematic illustration showing a cross-sectional view of a principal portion of the metal composite according to the second embodiment.

As shown in FIG. 7(b), in a metal composite 51 for fuel cells according to the second embodiment, a concave portion 5 is formed in each through-hole 4 similarly to the first embodiment shown in FIG. 2(b). Unlike the first embodiment, the projected hole wall portion (corresponding to the projection portion 3p in FIG. 2(b)) of the cladded layer regions of each through-hole 4 is bent inwardly to form a bent projection 3f. And, a dissolution-inhibiting material 6 is filled into the space of the concave portion 5 sandwiched between both bent projections 3f.

In a method of fabricating the metal composite 51 according to the second embodiment, firstly, the concave portion 5 is formed in each through-hole 4. Then, a punch having a head diameter slightly smaller than that of the through-hole 4 is pressed from both sides so that the projected hole wall portion (corresponding to the projection portion 3p in FIG. 2(b)) of each cladded layer 3 is bent inwardly to form the bent projection 3f.

Although the bent projections 3f (concave portion 5) alone provide a sufficient effect on reducing the corrosion of the core metal because of the same mechanism in the first embodiment, the filling of the dissolution-inhibiting material 6 in the space of the concave portion 5 sandwiched between both bent projections 3f can offer a more beneficial effect. After the filling of the dissolution-inhibiting material 6, the metal composite 51 shown in FIG. 7(b) is obtained.

The metal composite 51 has the same effects and advantages as the metal composite 1 of the first embodiment. In addition to these advantages, in this embodiment, after the etching of the core 2, the projected hole wall portion (corresponding to the projection portion 3p in FIG. 2(b)) of each cladded layer 3 is bent inwardly to form the bent projection 3f, thereby further stabilizing the filling of the dissolution-inhibiting material 6.

While the concave portion 5 is formed by chemical etching in the above embodiments, electrochemical etching such as electrolytic etching may be used. In this case, the etching is performed by immersing the composite metal body 1b (used as the anode electrode) in an electrolyte and applying a positive voltage thereto. In addition, the electrolytic etching may be continuously followed by anodization of the surface of the concave portion 5 of the core.

The present invention can also be applied to a metal composite in which another conductive coating is applied over each cladded layer 3. In this case, when an organic conductive coating that can react with or be dissolved in an etchant is used, the coating is preferably applied after the etching process for forming the concave portion 5.

Although the invention has been described with respect to the specific embodiments for complete and clear disclosure, the appended claims are not to be thus limited but are to be construed as embodying all modifications and alternative constructions that may occur to one skilled in the art which fairly fall within the basic teaching herein set forth.

What is claimed is:

1. A metal composite for fuel cells, comprising:
   a core of a metal;
   cladded layers of a corrosion resistant metal covering both surfaces of the core; and
   a through-hole formed through the core and cladded layers, the through-hole having, on a hole wall of the core region of the through-hole, a concave portion which is recessed relative to hole walls of the cladded layer regions of the through-hole; and
   a dissolution-inhibiting material for preventing dissolution of the core at least partially filling the concave portion, wherein the dissolution-inhibiting material is not provided on outer major surfaces of the cladded layers and wherein the through-hole extends through the dissolution-inhibiting material.

2. The metal composite according to claim 1, wherein: projected hole wall portion of each cladded layer region of the through-hole is bent inwardly.

3. A fuel cell bipolar plate fabricated from the metal composite according to claim 1.

4. A fabrication method for the metal composite for fuel cells according to claim 1, comprising steps of:
   covering both surfaces of a core of a metal with a cladded layer of a corrosion resistant metal;
   forming a through-hole through the core and cladded layers; etching a hole wall of the core region of the through-hole to form a concave portion which is recessed relative to hole walls of the cladded layer regions of the through-hole; and
   at least partially filling the concave portion with a dissolution-inhibiting material for preventing dissolution of the core, wherein the dissolution-inhibiting material is not provided on outer major surfaces of the cladded layers and wherein the through-hole extends through the dissolution-inhibiting material.

5. The fabrication method according to claim 4, further comprising step of:
   after the step of formation of the concave portion and before the step of at least partially filling the concave portion with the dissolution-inhibiting material, forcing a punch against and inwardly bending projected hole wall portion of each cladded layer region of the through-hole which is projected relative to the hole wall of the core region of the through-hole.

6. The fabrication method according to claim 4, further comprising steps of:
   after the step of formation of the concave portion and before the step of at least partially filling the concave portion with the dissolution-inhibiting material, anodizing a surface of the concave portion; and
   applying a boehmite treatment to the anodized surface.

7. The fabrication method according to claim 4, wherein the core comprises a metal selected from the group consisting of Al, Cu, Fe, Ni, Pb and stainless steel.

8. The fabrication method according to claim 7, wherein the cladded layers comprise a metal selected from the group consisting of Au, Pd, Pt, Ni, Ta, Nb, W, Ti and stainless steel.

9. The fabrication method according to claim 8, wherein the dissolution-inhibiting material comprises a resin.

10. The fabrication method according to claim 4, wherein the core is made of Al or an Al alloy.

11. The fabrication method according to claim 10, wherein the cladded layers are made of Ti or a Ti alloy.

12. The fabrication method according to claim 11, wherein the dissolution-inhibiting material comprises a resin.

13. The metal composite according to claim 1, wherein the core comprises a metal selected from the group consisting of Al, Cu, Fe, Ni, Pb and stainless steel.

14. The metal composite according to claim 13, wherein the cladded layers comprise a metal selected from the group consisting of Au, Pd, Pt, Ni, Ta, Nb, W, Ti and stainless steel.

15. The metal composite according to claim 14, wherein the dissolution-inhibiting material comprises a resin.

16. The metal composite according to claim 1, wherein core is made of Al or an Al alloy.

17. The metal composite according to claim 16, wherein the cladded layers are made of Ti or a Ti alloy.

18. The metal composite according to claim 17, wherein the dissolution-inhibiting material comprises a resin.

19. The metal composite according to claim 16, further comprising an oxide film provided on the concave portion of the hole wall of the core region of the through-hole.

20. The metal composite according to claim 19, further comprising boehmite provided on a surface of the oxide film.

* * * * *